United States Patent [19]

Briscoe et al.

[11] Patent Number: 5,714,283
[45] Date of Patent: Feb. 3, 1998

[54] LIAL/FES$_x$ BATTERY SEPARATOR SYSTEM WITH MICROPOROUS ELECTRODE PARTICLE RETAINER SCREENS

[75] Inventors: J. Douglass Briscoe, Westminster; Janet M. Embrey, Fallston, both of Md.; James G. Snyder, Hanover, Pa.; Salah M. Oweis, Ellicott City; Louis D'Ussel, Towson, both of Md.

[73] Assignee: Saft America, Inc., Valdosta, Ga.

[21] Appl. No.: 597,402

[22] Filed: Feb. 8, 1996

[51] Int. Cl.$^6$ .................................................. H01M 2/14
[52] U.S. Cl. .................................................. 429/247; 429/210
[58] Field of Search .................................. 429/153, 174, 429/210, 216, 241, 247

[56] References Cited

U.S. PATENT DOCUMENTS 5,254,415  10/1993  Williams et al. .

OTHER PUBLICATIONS

"Development of Prototypes Sealed Bipolar Lithium/Sulfide Cells" by T.D. Kaum et al., Electrochemical Technology Program Argonne National laboratory, Argonne, IL 60439, 26th IECEC Bostom, MA, Aug. 4–9, 1991, american Nuclear Soc. (1991). (month N/A).

"High Temperature Lithium/Sulfide Batteries" by T.D. Kaun et al., Argonne National Laboratory Chemical Technology Division, Electrochemical Technology Program, 9700 South Cass Ave., Argonne, IL 60439, 1993 (month N/A).

*Primary Examiner*—M. Nuzzolillo
*Attorney, Agent, or Firm*—Sughrue, Mion, Zinn, Macpeak & Seas, PLLC

[57] ABSTRACT

A separator system for a LiAl/FeS$_x$ electrochemical cell includes microporous sintered metal particle retainer screens fabricated by cold compacting, tape casting or plasma spraying, followed by sintering. The separator may consist of Al$_2$O$_3$ or MgO powder, AlN microporous particles, AlN microporous disk or ceramic standoff sandwiched between two screens or Al$_2$O$_3$ or MgO powder plasma sprayed onto one screen surface. The various separator system combinations are impregnated with 20% to 50% by volume electrolyte salt for ionic conductivity. Pore size is less than 10 μm, excluding electrode particles from reaching the separator.

26 Claims, 3 Drawing Sheets ically consist of a paste separator of salt plus magnesium oxide (MgO) ceramic powder binder and two photoetched particle retainer screens of molybdenum or stainless steel sandwiching opposite sides of the separator member operate over a life of less than 500 deep discharge cycles. After

LIAL/FES$_X$ BATTERY SEPARATOR SYSTEM WITH MICROPOROUS ELECTRODE PARTICLE RETAINER SCREENS

FIELD OF THE INVENTION

This invention relates to electrochemical cells or batteries of the LiAl/FeS$_x$ type with molten salt electrolyte, and more particularly to an improved separator system employing sintered metal microporous electrode particle retainer screens.

BACKGROUND OF THE INVENTION

Known LiAl/FeS$_x$ batteries or electrochemical cells typically consist of a paste separator of salt plus magnesium oxide (MgO) ceramic powder binder and two photoetched particle retainer screens of molybdenum or stainless steel sandwiching opposite sides of the separator member operate over a life of less than 500 deep discharge cycles. After numerous charging and discharging cycles, the electrode particle size becomes very small, less than 10 microns. Eventually these small particles pass through the large holes of the photoetched porous screens and deposit in the separator. The fine particle MgO content of the separator system cannot resist the force of the electrode particles, and the electrochemical cells finally fail by short circuit.

It is therefore an object of this invention to provide an improved separator system, and more particularly improved particle retainer screens which exclude electrode particles from reaching the separator that can short the cell while allowing free flow of molten salt and cations (typically Li$^+$ and K$^+$), which are flexible and which will not crack under cyclic operation, and in which the separator system is quite thin, reducing cell weight and volume thereby enhancing the compactness of the electrochemical cell or battery.

It is a further object of the present invention to provide improved microporous metal particle retainer screens which may be readily toleranced, formed or welded to electrode cups, rings or bipolar plates to completely encapsulate the electrode materials of the cell, and wherein the sintered metal microporous particle retainer screens may be integrated into anyone of a chalcogenide type (see FIG. 7 of "DEVELOPMENT OF PROTOTYPES SEALED BIPOLAR LITHIUM/SULFIDE CELLS" by T. D. Kaum et al, Electrochemical Technology Program Argonne National Laboratory, Argonne, Ill. 60439, 26th IECEC Boston, Mass., Aug. 4–9, 1991, American Nuclear Soc. (1991); and FIG. 17 of "HIGH TEMPERATURE LITHIUM/SULFIDE BATTERIES" by T. D. Kaun et al, Argonne National Laboratory Chemical Technology Division, Electrochemical Technology Program, 9700 South Cass Avenue, Argonne, Ill. 60439) seal configuration, plasma sprayed seal configuration, or a thermal compression seal configuration, and wherein the separator system ensures a significantly greater than 500 cycles cell life.

SUMMARY OF THE INVENTION

The present invention is directed to a current separator system for a LiAl/FeS$_x$ electrochemical cell comprising preferably a separator member for separating the positive and negative electrodes of the cell and two metal electrode particle retainer screens sandwiching, respectively, opposite sides of the separator member. The improvement resides in the metal particle retainer screens being flexible, sintered metal microporous particle retainer screens having preferably 20% to 50% microporous through porosity by volume and being of a thickness in the range of 0.003 to 0.025 inches, thereby providing a separator assembly wherein the microporous sintered metal retainer screens exclude electrode particles of a nominal 10 micron size, while allowing free flow of metal salt and cations (typically Li$^+$ and K$^+$) between the electrodes, which sintered metal microporous particle retainer screens will not crack under cyclic charging and discharging, while providing a cell life in excess of 500 cycles and which permits the sintered metal microporous particle retainer screens to be toleranced, formed or welded to electrode cups, rings and bipolar plates to ensure complete encapsulation of the electrode materials. The sintered metal microporous particle retaining screens may be of stainless steel or of molybdenum powder, they may be of sintered cold compacted powder, of sintered plasma sprayed stainless steel or molybdenum powder. The separator may consist of an Al$_2$O$_3$ or MgO ceramic powder and electrolyte salt paste construction, or be comprised of microporous AlN plate or ceramic standoff separating the microporous sintered metal electrode particle screens and a flooded salt electrolyte, or AlN and electrolyte salt.

In another form of the invention, the separator element may be an integral plasma sprayed layer of porous MgO or Al$_2$O$_3$ onto a surface of one of the flexible sintered metal microporous particle retainer screens facing the other of the screens, with that layer impregnated with electrolyte salt.

BRIEF DESCRIPTION OF THE DRAWINGS

FIG. 17 of "HIGH TEMPERATURE LITHIUM/SULFIDE BATTERIES" by T. D. Kaun et al, Argonne National Laboratory Chemical Technology Division, Electrochemical Technology Program, 9700 South Cass Avenue, Argonne, Ill. 60439) sealed bipolar cell modified to use the improved flexible sintered metal microporous electrode particle retainer screens separated by MgO and electrolyte salt paste forming one preferred embodiment of the invention.

DESCRIPTION OF THE PREFERRED EMBODIMENTS

Figure 1:
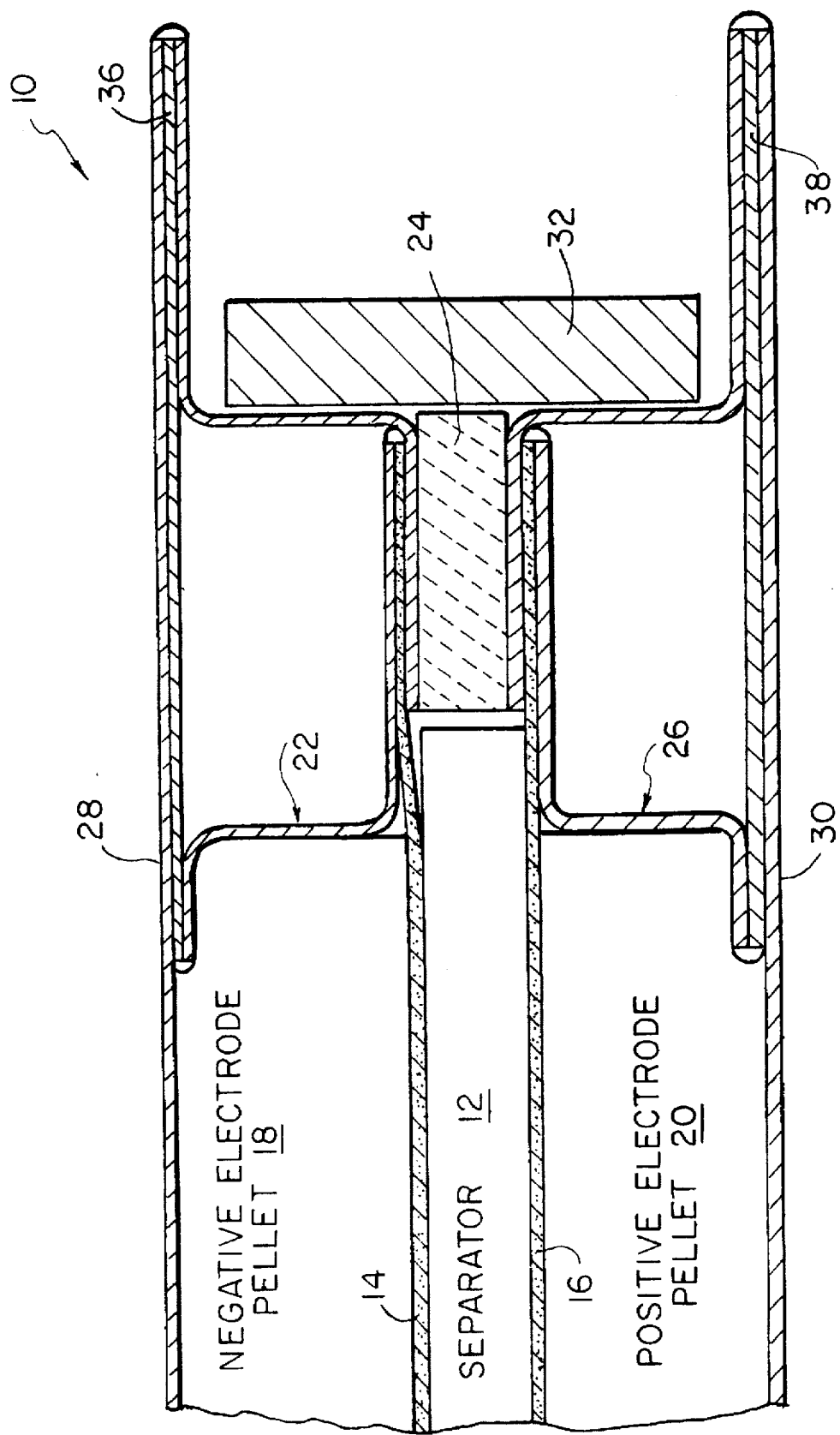
FIG. 1 is a schematic sectional view of a portion of a chalcogenide type (see FIG. 7 of "DEVELOPMENT OF PROTOTYPES SEALED BIPOLAR LITHIUM/SULFIDE CELLS" by T. D. Kaum et al, Electrochemical Technology Program Argonne National Laboratory, Argonne, Ill. 60439, 26th IECEC Boston, Mass., Aug. 4–9, 1991, American Nuclear Soc. (1991)

Referring to FIG. 1, there is illustrated one embodiment of a LiAl/FeS$_x$ battery in the form of a chalcogenide sealed bipolar cell indicated generally at 10 with an improved separator system forming one embodiment of the invention. The sealed bipolar cell 10 includes a separator 12 of the paste type comprised of an electrolyte salt and magnesium oxide (MgO) ceramic powder binder sandwiched by two metal electrode particle retainer screens 14, 16. The microporous particle retainer screen 14 is a flexible, sintered metal microporous particle retainer screen formed of stainless steel, while that at 16 is a flexible, sintered metal microporous particle retainer screen formed of molybdenum. The screens 14, 16 are preferably capable of excluding all electrode particles even less than 10 μm in size from the separator electrolyte, thereby preventing shorting of the cell 10.

The microporous particle retainer screens 14 and 16 may be made by several methods. One such method involves cold compacting of stainless steel or molybdenum powder, with or without a pore former, into a thin disk which is then sintered to form a screen, for example, of 5 to 7 inches in diameter and having a thickness from 0.008 to 0.025 inches and having 20% to 50% microporous through porosity. Typically, the pore size of the screens 14, 16 is less than 10 μm. Alteratively, the stainless steel or molybdenum powder may be plasma sprayed into a thin layer with a thickness from 0.005 to 0.012 inches, with or without a pore former, to obtain a disk as described immediately above.

As a third method, the stainless steel or molybdenum powder may be tape cast as a thin tape with a thickness from 0.003 to 0.025 inches and disk parts then die cut from the tape.

Subsequently, the formed metal disks are sintered in each of the three methods to obtain a final disk in accordance with the properties and characteristics of that effected by cold compacting, the first method described.

The actual separator 12 needs to function only to provide an electrical separation of the screens 14, 16 which in turn are in direct contact with the negative electrode pellet 18 and the positive electrode pellet 20, respectively. The negative electrode pellet may be formed of LiAl and salt electrolyte and additives. The positive electrode pellet 20 in this embodiment may comprise $FeS_2$ and salt electrolyte and additives. The negative electrode assembly 18 is completed by way of a 316L SST (stainless steel) cup 22 which encompasses the negative electrode pellet 18 and which is welded to ring 36 and the bipolar plate 28 at opposite ends of the cup and welded to the end of the microporous sintered stainless steel electrode particle retainer screen 14. Interposed between the stainless steel sintered electrode particle retainer screen 14 and the microporous sintered molybdenum electrode particle retainer screen 16 is a seal ring 24 formed of chalcogenide ceramic. Similarly, a molybdenum cup 26 is positioned beneath the seal ring 24 and is welded to the molybdenum microporous sintered electrode particle retainer screen 16 at its periphery and is welded at the edges of flange portions thereof to ring 38 and to the molybdenum bipolar plate 30. A large annular fixture ring 32 formed preferably of $Al_2O_3$ completes the assembly for the baseline bipolar cell 10. The cell 10 is of pancake shape.

Figure 2:
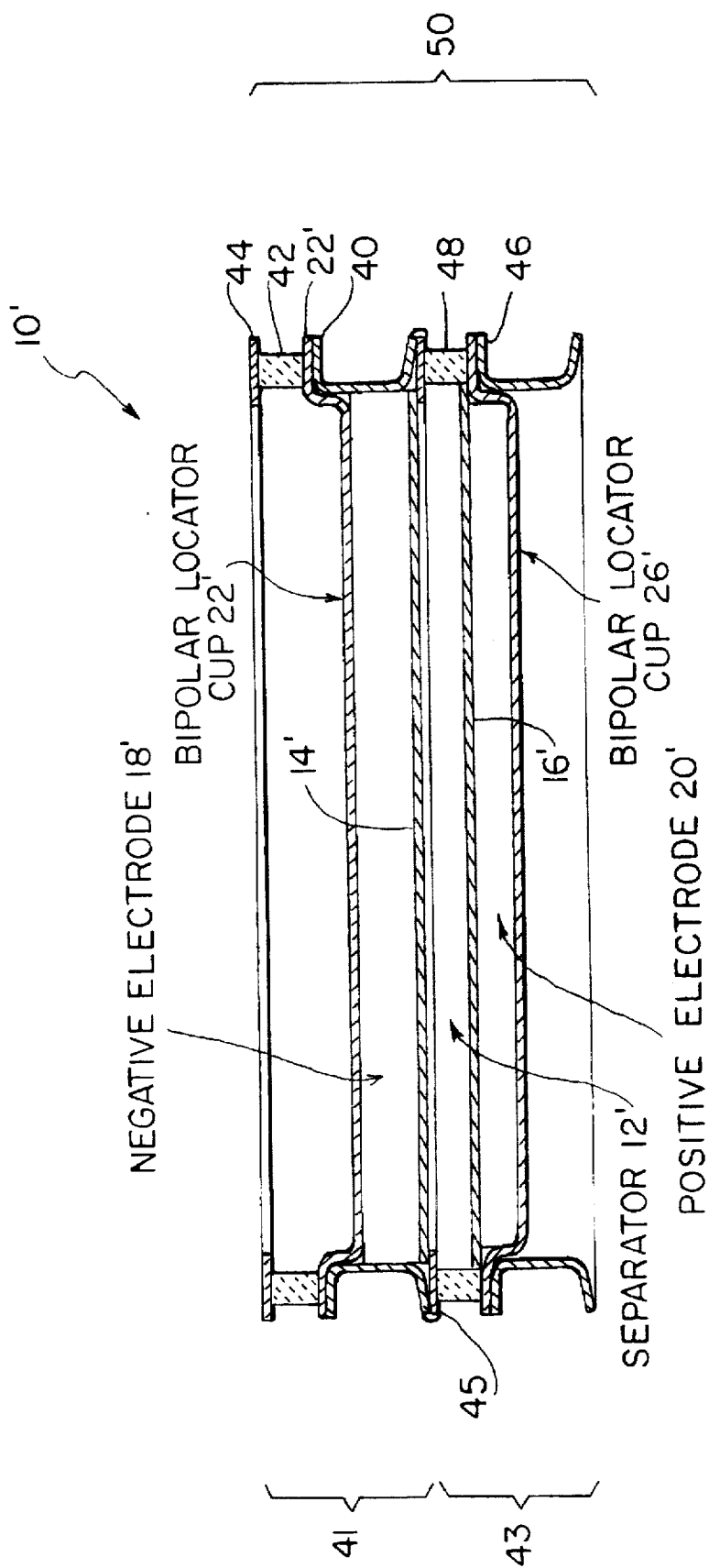
FIG. 2 is a schematic sectional view of a thermal compression/solid diffusion bond sealed (see U.S. patent application Ser. No. 08/328,299, now U.S. Pat. No. 5,529,858, filed Oct. 24, 1994 to Dr. Salah Oweis, entitled "HERMETICALLY SEALED THERMOCOMPRESSION FEEDTHROUGH/PERIPHERAL SEAL FOR HIGH TEMPERATURE LITHIUM BASED CELLS) lithium alloy-metal sulfide bipolar electrochemical cell modified to use incorporate a separator of AlN porous plate and electrolyte salt with metal microporous particle retainer screens forming a preferred embodiment of the invention.
Figure 3:
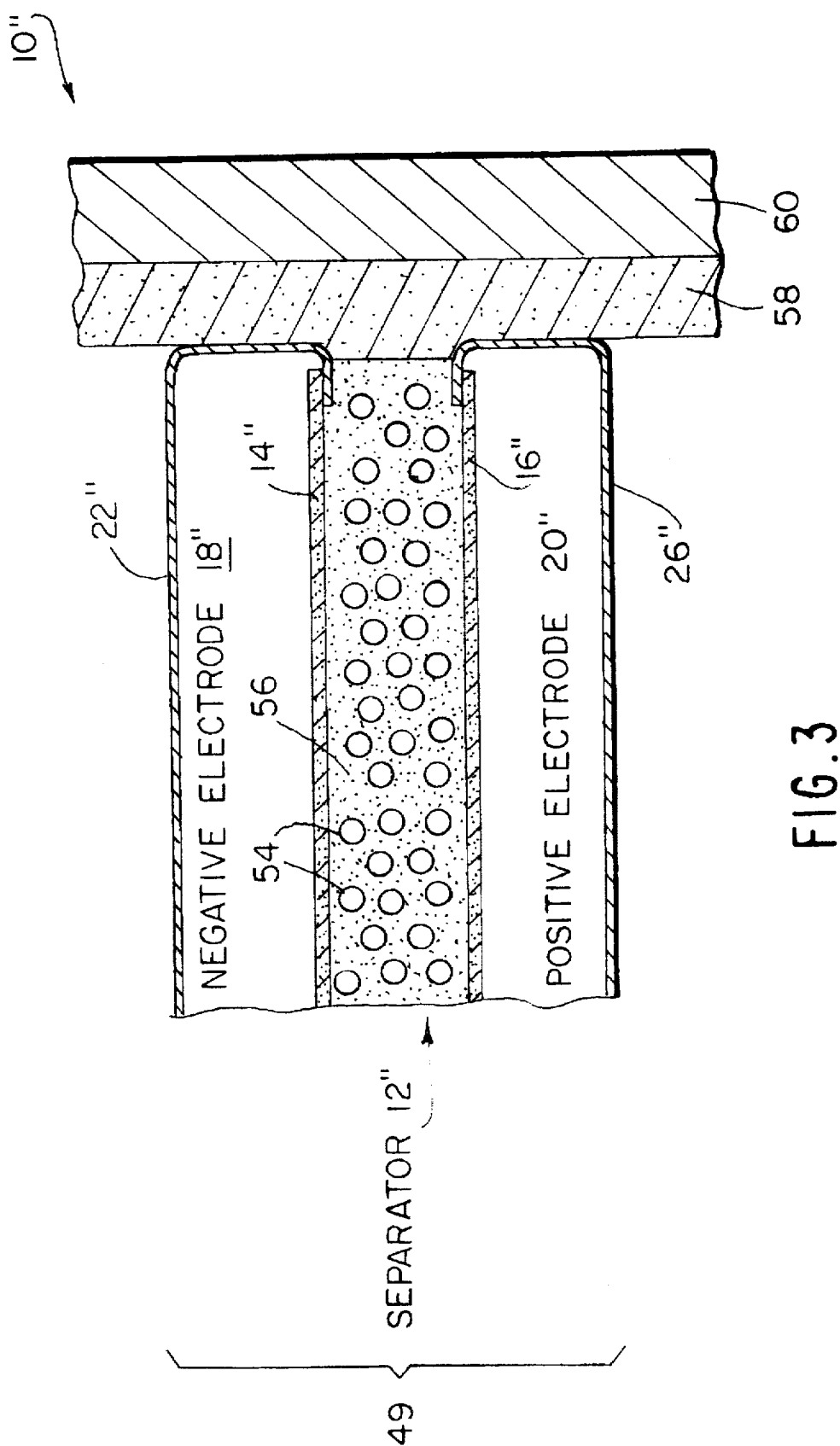
FIG. 3 is a schematic sectional view of a portion of a plasma sprayed sealed (see U.S. Pat. No. 5,254,415, issued Oct. 19, 1993 to Williams et al. entitled "STACKED CELL ARRAY BIPOLAR BATTERY WITH THERMAL SPRAYED CONTAINER AND CELL SEAL] LiAl/FeS$_x$ battery modified to include a separator of microporous AlN particles and electrolyte salt separated by microporous stainless steel and microporous molybdenum sintered particle retainer screens forming yet a further embodiment of the invention.

As may be appreciated, the invention in the three embodiments of FIGS. 1, 2 and 3 replaces inadequate photoetched or woven wire particle retainer screens with microporous sintered metal particle retainer screens, for example those at 14 and 16 in the embodiment of FIG. 1. These microporous sintered metal retainer screens exclude all electrode particles from the separator electrolyte, thereby preventing cell shorting. At the same time, they allow free flow of molten salt and cations. Since the screens are flexible and will not crack, they have a long life unlike the prior art microporous ceramic separators made from sintered fibers, felts or powders such as AlN, MgO or BN. The separator system of cell 10 may be made very thin on the order of 0.4 to 1.3 mm, thereby reducing cell weight and volume and ensuring a highly compact cell structure. By TIG welding at the various positions illustrated in FIG. 1, the flexible sintered metal microporous particle retainer screens 14, 16 are welded to electrode cups 22, 26, rings 24 and bipolar plates 28, 30 to form a peripheral sealed cell structure. The bipolar plates are preferably formed of molybdenum. The result is to complete a chalcogenide sealed bipolar cell or other type of electrochemical cell exhibiting greater than 500 cycles of cell life.

FIG. 2 shows a lithium alloy-metal sulfide bipolar stack cell indicated generally at 10' with elements common to that of the first embodiment given prime designations. Instead of welding the components of the stacked assembly together and to effect a completely encapsulated structure for the electrode materials as in the embodiment of FIG. 1, the components at the periphery of the bipolar stack 10' are bonded via a suitable bond material by thermal compression or by solid diffusion bonding under pressure and with the assembly subject to a temperature capable of effecting solid metal diffusion of the contacting component materials at their interface.

Again the invention lies in this embodiment in the incorporation of microporous stainless steel flexible sintered particle retainer screen 14' and molybdenum microporous sintered metal particle retainer screen 16' on opposite sides of the separator 12'. A vertical stacked array of elements forms an assembly to be sealed via a combination of thermal compression, solid metal diffusion bond and welding. That stack or assembly of cell 10' from top to bottom consists of a steel ring 44, a ceramic AlN ring 42, a bipolar locator cup 22', negative electrode 18', a C-shaped cross-section steel sealing ring 40, stainless steel sintered microporous particle retainer screen 14', separator 12', microporous molybdenum sintered particle retainer screen 16', positive electrode 20', second bipolar locator cup 26' and a second C-shaped cross-section steel sealing ring 46. The components of the stack are placed under compression with a bond material disposed between the upper surface of the AlN ring 42 and the steel sealing ring 44, the same bond material between the lower surface of the AlN ring 42 and the flange of the locator cup 22', direct contact between the bottom surface of the locator cup 22' flange and the underlying C-shaped cross-section steel sealing ring 40 with appropriate similar component material content and thermal compression and solid diffusion bonding occurring for the second AlN ceramic seal ring 48, the locator cup 26' and C-shaped cross-section steel sealing ring 46. Welding effects a peripheral sealed connection between the periphery of the steel sealing ring 45 resting on the upper surface of the AlN ceramic ring 48 and the lower edge of an oblique flange of the C-shaped cross-section steel sealing ring 40, components of seal assembly 41 and seal assembly 43, respectively.

In this embodiment, the microporous particle retainer screens 14', 16' are preferably formed by tape casting stainless steel or molybdenum powder, with or without a pore former, to obtain the disk form members 14', 16'. The separator 12' may comprise a ceramic standoff such as an AlN porous plate and a flooded salt electrolyte as the basic components of that structure. In a more simplified form of structure and one of which may be substantially thinner than that provided by a ceramic standoff such as an AlN porous plate and flooded salt electrolyte, a plasma sprayed layer of porous MgO or $Al_2O_3$ onto the surface of the microporous stainless steel sintered particle retainer screen 14' facing the underlying microporous sintered molybdenum particle retainer screen 16' creates a separator capable of preventing the screens 14', 16' from touching and short circuiting.

In the various embodiments of FIGS. 1, 2 and 3, the microporous particle retainer screens may be made by the methods described in detail with respect to the embodiment of FIG. 1, as well as the various forms for the separators sandwiched by those particle retainer screens. The separator assemblies are subsequently impregnated with 20% to 50% volume percent electrolyte salt for ionic conductivity.

FIG. 3 illustrates an enlarged sectional view of a portion of a $LiAl/FeS_x$ battery or electrochemical cell 10" as a third embodiment of the invention in which similar elements to that of FIG. 1 have double prime numerical designations. A separator assembly or system 49 is comprised of stacked and sealed components including separator 12". A microporous stainless steel flexible sintered metal microporous particle retainer screen 14" is on the upper side or face of separator 12" and a microporous molybdenum sintered metal particle retainer screen 16" lies on the bottom face thereof. A negative electrode 18" overlying the sintered microporous particle retainer screen 14" and a positive electrode 20" lies beneath and in contact with the microporous sintered molybdenum particle retainer screen 16", with the stack completed by a stainless steel crimped cup 22" about the negative electrode 18" and sealed to the microporous particle retainer screen 14", along with a similar crimped molybdenum cup 26" about positive electrode 20" and crimped to the underlying microporous molybdenum particle retainer screen 16". The separator 12" in the illustrated embodiment of FIG. 3 utilizing microporous particle retainer screens 14", 16" is comprised essentially of large microporous AlN particles 54 and a electrolytic salt 56. The plasma sprayed stainless steel and molybdenum powder microporous screens 14", 16" are positioned as shown, and the ends of the stainless steel cups 22" and the molybdenum cup 26" are crimped over respective screens 14" and 16" to form a sealed assembly 49. Those crimps are effected proximate to the outer peripheries of the microporous screen 14", 16" disks. Alternatively, the particle retainer screens may be made of cold compacted stainless steel subsequently sintered, or by tape casting stainless steel and molybdenum power into thin tapes and die cutting retainer screen disk parts as described above with respect to the embodiment of FIG. 1.

Similarly, separator 12" may be alternatively formed of MgO ceramic powder and electrolytic salt paste, or by using a ceramic standoff and a flooded salt electrolyte, or by plasma spraying a layer of porous MgO or $Al_2O_3$ onto one of the surfaces of the microporous screens 14", 16", facing the other of said microporous screens. The cell 10" is further constructed of magnesium oxide (MgO), end wall 58 which abuts the stacked assembly 49 on one side and a 410 stainless steel wall 60 on the opposite side. The walls or exterior layers 58, 60 may be plasma sprayed to complete the structural assembly and sealing or complete encapsulation of the cell electrode materials.

While the invention has been described with preferred embodiments, it is to be understood that variations and modifications may be employed without departing from the scope of the invention as defined in the following claims.

What is claimed is:

1. In a separator system for a molten salt Li alloy/$FeS_x$ electrochemical cell comprising:

positive and negative electrodes, a separator for separating positive and negative electrodes interposed between said electrodes, two metal electrode particle retainer screens sandwiching opposite sides of said separator member and facing respectively said positive and negative electrodes, the improvement wherein:

said metal particle retainer screens comprise flexible, sintered metal microporous particle retainer screens, thereby providing a separator assembly wherein the sintered metal microporous particle retainer screens exclude electrode particles from entering the separator thereby eliminating self shorting while allowing free flow of molten electrolyte salt and cations, and wherein the microporous particle retainers screens will not crack under cyclical charging and discharging, the cell life is in excess of 500 cycles, and the microporous screens may be toleranced, formed or welded to electrical cups, ceramic rings or bipolar plates to completely encapsulate the electrode materials.

2. The separator system as claimed in claim 1, wherein said flexible sintered metal microporous particle retainer screens have a 20% to 50% microporous through porosity by volume and being of a thickness in the range of 0.003 to 0.025 inches.

3. The separator system as claimed in claim 1, wherein said flexible, sintered metal microporous particle retainer screens are of one material of the group consisting of stainless steel and molybdenum powder.

4. The separator system as claimed in claim 1, wherein the pore size of the flexible, sintered metal microporous particle retainer screens is less than 10 μm.

5. The separator system as claimed in claim 1, wherein said flexible, sintered metal microporous particle retainer screens are of sintered, cold compacted powder.

6. The separator system as claimed in claim 1, wherein said flexible, sintered metal microporous particle retainer screens are of a sintered plasma sprayed metal of the group consisting of stainless steel and molybdenum powder.

7. The separator system as claimed in claim 1, wherein said separator assembly thickness is in the range of 0.4 to 1.3 mm.

8. The separator system as claimed in claim 1, wherein said separator consists of $Al_2O_3$ or MgO ceramic powder and electrolyte salt paste.

9. The separator system as claimed in claim 1, wherein said separator comprises a ceramic standoff separating the sintered metal microporous particle retainer screens and a flooded salt electrolyte about said standoff.

10. The separator system as claimed in claim 1, wherein said ceramic standoff comprises an AlN porous plate.

11. The separator system as claimed in claim 1, wherein said separator comprises microporous AlN particles and electrolyte salt.

12. The separator system as claimed in claim 1, wherein said separator comprises a sprayed porous layer of one material from the group consisting of MgO and $Al_2O_3$ on a face of one of said sintered metal microporous particle retainer screens facing another of said screens, and wherein said plasma sprayed porous layer separator is impregnated with an electrolyte salt.

13. The separator system as claimed in claim 1, wherein said flexible sintered metal microporous particle retainer screens comprise a die cut tape of one material of the group consisting of stainless steel powder and molybdenum powder.

14. An electrochemical cell, comprising positive and negative electrodes, a separator interposed between said electrodes, and two flexible, sintered metal microporous particle retainer screens sandwiching opposite sides of said separator member and facing respectively said positive and negative electrodes.

15. The cell as claimed in claim 14, wherein said flexible sintered metal microporous particle retainer screens have a 20% to 50% microporous through porosity by volume are of a thickness in the range of 0.003 to 0.025 inches.

16. The cell as claimed in claim 14, wherein said flexible, sintered metal microporous particle retainer screens are of one material of the group consisting of stainless steel and molybdenum powder.

17. The cell as claimed in claim 14, wherein the pore size of the flexible, sintered metal microporous particle retainer screens is less than 10 µm.

18. The cell as claimed in claim 14, wherein said flexible, sintered metal microporous particle retainer screens are of sintered, cold compacted powder.

19. The cell as claimed in claim 14, wherein said flexible, sintered metal microporous particle retainer screens are of a sintered plasma sprayed metal of the group consisting of stainless steel and molybdenum powder.

20. The cell as claimed in claim 14, wherein said separator and screens comprise a separator assembly with a thickness in the range of 0.4 to 1.3 mm.

21. The cell as claimed in claim 14, wherein said separator consists of $Al_2O_3$ or MgO ceramic powder and electrolyte salt paste.

22. The cell as claimed in claim 14, wherein said separator comprises a ceramic standoff separating the sintered metal microporous particle retainer screens and a flooded salt electrolyte about said standoff.

23. The cell as claimed in claim 14, wherein said ceramic standoff comprises an AlN porous plate.

24. The cell as claimed in claim 14, wherein said separator comprises microporous AlN particles and electrolyte salt.

25. The cell as claimed in claim 14, wherein said separator comprises a sprayed porous layer of one material from the group consisting of MgO and $Al_2O_3$ on a face of one of said sintered metal microporous particle retainer screens facing another of said screens, and wherein said plasma sprayed porous layer separator is impregnated with an electrolyte salt.

26. The cell as claimed in claim 14, wherein said flexible sintered metal microporous particle retainer screens comprise a die cut, thin tape of one material of the group consisting of stainless steel powder and molybdenum powder.

* * * * *